United States Patent [19]
Henry et al.

[11] Patent Number: 5,864,877
[45] Date of Patent: Jan. 26, 1999

[54] APPARATUS AND METHOD FOR FAST FORWARDING OF TABLE INDEX (TI) BIT FOR DESCRIPTOR TABLE SELECTION

[75] Inventors: Glenn Henry; Terry Parks, both of Austin, Tex.

[73] Assignee: Integrated Device Technology, Inc., Santa Clara, Calif.

[21] Appl. No.: 712,203

[22] Filed: Sep. 11, 1996

[51] Int. Cl.$^6$ ...................................................... G06F 12/00
[52] U.S. Cl. ............................................ 711/208; 711/206
[58] Field of Search ................................. 711/206, 207, 711/208, 205, 169

[56] References Cited

U.S. PATENT DOCUMENTS 4,442,484  4/1984  Childs, Jr. et al. ...................... 711/163
5,517,651  5/1996  Huck et al. .............................. 711/208
5,596,735  1/1997  Hervin et al. ........................... 711/205

*Primary Examiner*—Glenn Gossage
*Attorney, Agent, or Firm*—James W. Huffman

[57]  ABSTRACT

An apparatus and method for improving descriptor load time in a microprocessor are provided. The method and apparatus provide an instruction sequence which loads a selector, forwards a table index (TI) bit retrieved from the selector for use by the next instruction which loads the descriptor. Forwarding of the table index bit to a register file selects between a global descriptor table and a local descriptor table for loading the descriptor, without intervening instructions or clock cycles. The forwarded table index selectively addresses either the global descriptor table or the local descriptor table only when a descriptor load instruction is immediately preceded by a selector load instruction.

36 Claims, 7 Drawing Sheets

Figure 4

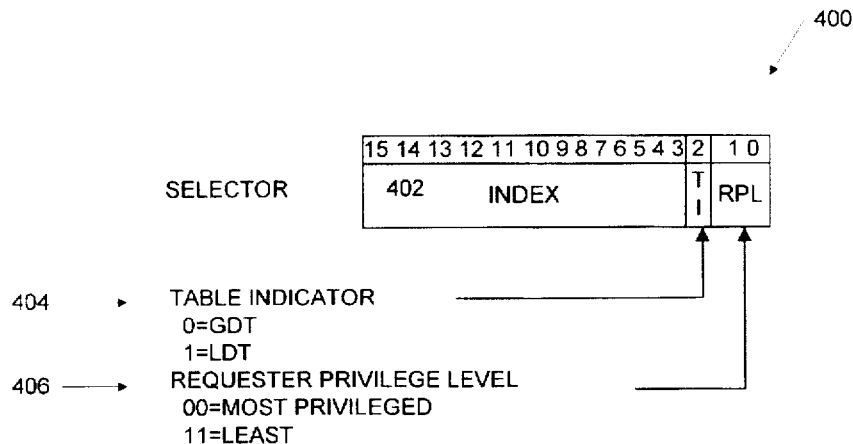

SELECTOR

| 15 14 13 12 11 10 9 8 7 6 5 4 3 | 2 | 1 0 |
|---|---|---|
| 402    INDEX | TI | RPL |

404 → TABLE INDICATOR
0=GDT
1=LDT

406 → REQUESTER PRIVILEGE LEVEL
00=MOST PRIVILEGED
11=LEAST

Figure 5

| 31 30 29 28 27 26 25 24 | 23 | 22 | 21 | 20 | 19 18 17 16 | 15 | 14 13 | 12 | 11 10 9 8 | 7 6 5 4 3 2 1 0 |
|---|---|---|---|---|---|---|---|---|---|---|
| BASE 31:24 | G | D/B | 0 | AVL | SEG LIMIT 19:16 | P | DPL | S | TYPE | BASE 23:16 |
| BASE ADDRESS 15:00 | | | | | | SEGMENT LIMIT 15:00 | | | | |
| 31 30 29 28 27 26 25 24 23 22 21 20 19 18 17 16 | | | | | | 15 14 13 12 11 10 9 8 7 6 5 4 3 2 1 0 | | | | |

AVL  AVAILABLE FOR USE BY SYSTEM SOFTWARE
BASE  SEGMENT BASE ADDRESS
D/B  DEFAULT OPERATION SIZE
     (0 = 16-BIT SEGMENT; 1 = 32-BIT SEGMENT)
DPL  DESCRIPTOR PRIVILEGE LEVEL
G    GRANULARITY
LIMIT  SEGMENT LIMIT
P    SEGMENT PRESENT
S    DESCRIPTOR TYPE
     (0 = SYSTEM; 1 = APPLICATION)
TYPE  SEGMENT TYPE

  RESERVED

Figure 8

Pipeline flow for prior art Descriptor load

| Cycle | Fetch | Translator | Register | Address | Data | Write Back | |
|---|---|---|---|---|---|---|---|
| 1 | MOV DS,AX | | | | | | |
| 2 | X | MOV DS,AX | | | | | |
| 3 | | X | Load temp,AX | | | | |
| 4 | | | BT temp,#5 | Load temp,AX | | | |
| 5 | | | JC LDTR | BT temp,#5 | Load temp,AX | | |
| 6 | | | JMP GDTR | JC LDTR | BT temp,#5 | Load temp,AX | ⎫ |
| 7 | | | X | JMP GDTR | JC LDTR | BT temp,#5 | ⎬ 3 clock cycles |
| 8 | | | | X | JMP GDTR | JC LDTR | ⎭ |
| . | | | | | X | JMP GDTR | |
| . | | | | | | X | |

Figure 9

Pipeline flow for Descriptor load

| Cycle | Fetch | Translator | Register | Address | Data | Write Back | |
|---|---|---|---|---|---|---|---|
| 1 | MOV DS,AX | | | | | | |
| 2 | X | MOV DS,AX | | | | | |
| 3 | | X | XTI DS,AX | | | | |
| 4 | | | XLDESC DS | XTI DS,AX | | | |
| 5 | | | X | XLDESC DS | XTI DS,AX | | |
| 6 | | | | X | XLDESC DS | XTI DS,AX | ⎫ 2 clock |
| 7 | | | | | X | XLDESC DS | ⎬ cycles |
| 8 | | | | | | X | ⎭ |
| . | | | | | | | |
| . | | | | | | | |

APPARATUS AND METHOD FOR FAST FORWARDING OF TABLE INDEX (TI) BIT FOR DESCRIPTOR TABLE SELECTION

BACKGROUND OF THE INVENTION

1. Field of the Invention

This invention relates in general to the field of memory segmentation, and more particularly to an improved method and apparatus for loading a segment register within a processing system.

2. Description of the Related Art

Memory management is a hardware mechanism which lets operating systems create simplified environments for running programs. For example, when several programs are running at the same time, they must each be given an independent address space. If they all had to share the same address space, each would have to perform difficult and time consuming checks to avoid interfering with the others.

Memory management consists of two methodologies called segmentation and paging. Segmentation is used to give each program several independent, protected address spaces. Paging is used to support an environment where large address spaces are simulated using a small amount of RAM and some disk storage. When several programs are running at the same time, either mechanism can be used to protect programs against interference from other programs. The following discussion will focus on segmentation.

Segmentation organizes memory into a collection of variable-size units, called segments. Within x86 processors, a two-part address is utilized: a segment part and an offset part. For a general background on segmentation in x86 processors, please see U.S. Pat. No. 4,442,484 issued to Childs, Jr. et al. The first part of the address, the segment part, defines a base address for a segment, and the offset defines a particular memory location which is offset from the base address.

To access data within a given memory segment, a program must first load a segment register with a special value that identifies that segment. This special value is called a selector. Programs then reference memory by specifying, either implicitly, explicitly, or by default, the segment register containing the selector for the segment part of the address. When a selector is referenced, it is used to determine the base address for the segment. The base address is then added to the offset to form the linear address for the memory location to be accessed.

More specifically, the selector is used to index into one of a number of descriptor tables which contain, descriptors. Descriptors define a base address for each segment, the largest offset that can be used with the segment (the limit), and various attributes of the segment such as whether the segment can be read from, written to, or executed as a program, the privilege level of the segment, etc. In an x86 environment, two descriptor tables are provided: 1) the Global Descriptor Table (GDT); and 2) the Local Descriptor Table (LDT). A third descriptor table (IDT) is provided for interrupt routines, but will be ignored for purposes of the present discussion. Each of the descriptor tables can contain up to 8,192 descriptors corresponding to 8,192 possible segments within memory. The descriptor tables are stored in memory.

The selector is a 16-bit value. Bits 3-15 of the selector, termed the descriptor index, define one of the 8,192 descriptors within one of the two descriptor tables. Bit 2, termed the table index (TI), selects which of the two tables, GDT or LDT, contains the descriptor of interest. Bits 0-1 contain the requested privilege level of the access.

As mentioned above, to access a particular memory segment, a program must first load a selector which identifies the segment into a segment register. Commensurate with the loading of the selector, the descriptor which defines the segment is loaded into a hidden or shadow register termed the descriptor register, which is associated with the segment register. Future references to the segment can then utilize the base address, limit, and attributes of the segment by retrieving the descriptor directly from the segment register, without requiring access to one of the two descriptor tables in memory.

When loading a segment register with a selector, and its associated descriptor, the selector is first loaded into a temporary register. The content of the TI bit is then extracted to determine which of the two descriptor tables, GDT or LDT, contains the descriptor to be loaded. Once the value of the TI bit is determined, the appropriate descriptor table is referenced to retrieve the descriptor for the memory segment. The descriptor is then stored in the shadow descriptor register, and the selector is written from the temporary register into the segment register. Thus, each time a segment register is loaded, at least three steps are required: 1) load the selector into a temporary register; 2) extract the TI bit to determine whether the descriptor is in the GDT or LDT; and 3) load the descriptor/selector into the segment register.

Hardware implementations of memory segmentation utilize a limited number of segment registers for storing selectors/descriptors. The segment registers allow programs to calculate memory locations for different segments, without having to reload the segment registers from memory. However, with over 16,000 possible memory segments, it is frequently necessary to overwrite previously used selector/descriptor information in the segment registers with new selector/descriptor information. And, each time access to a new memory segment is desired, program processing is delayed until the new selector/descriptor information can be loaded from memory into a segment register.

In the prior art, loading of a selector/descriptor into a segment register required at least three steps before access to the memory segment could be performed. As mentioned above, one of these steps includes determining which of the two descriptor tables contains the descriptor of interest, i.e., extracting the TI bit from the selector. One method which has been used performs a bit test on the selector to determine whether the TI bit selects the GDT or the LDT. A branch to one of two descriptor routines is then performed based on the outcome of the bit test. But, performing a bit test, and then a branch creates costly processing delays during program execution.

A second method used to determine whether the LDT or GDT is referenced by a selector is to extract the TI bit during the selector load, and feed the extracted bit back into the address operand of the following instruction. However, prior to multiplexing ("muxing") in the TI bit, the following instruction needs to be decoded to determine whether or not the TI bit should in fact be multiplexed into the register address. If a descriptor load instruction follows a selector load instruction, then mux it in. If a descriptor load instruction does not follow extracting the TI bit, then do not mux it in. However, the instruction decode to determine whether the following instruction was a descriptor load also required valuable processing time.

What is needed is a an apparatus and method which minimizes delays associated with the loading of a selector/ descriptor into a segment register. More specifically, what is needed is a mechanism which eliminates the processing delay associated with determining which descriptor table contains the descriptor to be loaded into the segment register.

SUMMARY

To address the above-detailed deficiencies, it is an object of the present invention to provide an apparatus and method for improving the execution speed of a descriptor load operation.

It is another object of the present invention to prevent processing delays typically associated with selecting a descriptor table prior to loading a descriptor.

Accordingly, in the attainment of the aforementioned objects, it is a feature of the present invention to provide a descriptor loading circuit, within a processing system, for selecting a descriptor to be loaded from a plurality of descriptor tables, the descriptor loading circuit including: an instruction register, for storing micro instructions to be executed by the processing system; and a register file, connected to the instruction register. The register file includes: a plurality of segment registers, each for storing a selector and a descriptor; a first descriptor table register, for storing an address associated with a first descriptor table; and a second descriptor table register, for storing an address associated with a second descriptor table. The descriptor loading circuit further includes: a table index (TI) forward bus, connected to the register file, for forwarding a first indicator from a first selector retrieved by a first one of the micro instructions, the first indicator indicating whether the descriptor to be loaded is to be retrieved from the first descriptor table or the second descriptor table; and descriptor table selection logic, connected to the TI forward bus, and to the register file, for selecting whether the first or the second descriptor table register is to be used to load the descriptor from the first or the second descriptor table, as indicated by either the first indicator forwarded by the TI forward bus, or by a second indicator retrieved by a second one of the micro instructions.

In another aspect, it is a feature of the present invention to provide a table index (TI) bit forwarding circuit, within a microprocessor, for improving the execution time of a sequence of micro instructions which load a descriptor, the TI bit forwarding circuit including: a register file, for storing a selector which includes a table index (TI) bit, the selector corresponding to the descriptor which is to be loaded. The register file includes: a segment register, into which the descriptor is to be loaded; a first descriptor table register, for storing an address associated with a first descriptor table; and a second descriptor table register, for storing an address associated with a second descriptor table; wherein the TI bit within the selector indicates whether the first descriptor table register or the second descriptor table register is to be used to load the descriptor into the segment register. The TI bit forwarding circuit further includes: a TI bit forward bus, connected to the register file, for forwarding the TI bit within the selector which is retrieved from the register file during a first micro instruction; and a TI bit selection circuit, connected to the TI bit forward bus, and to the register file, for utilizing the forwarded TI bit to select between the first descriptor table register and the second descriptor table register during a second micro instruction; whereby when the forwarded TI bit is used to select between the first and second descriptor table registers, the second micro instruction immediately follows the first micro instruction.

In yet another aspect, it is a feature of the present invention to provide an instruction sequence, within a processing system, the instruction sequence for loading a descriptor into a segment register. The instruction sequence includes: a selector load instruction, for reading a selector from a general purpose register, and for forwarding a table index from the selector to selectively address a descriptor table from one of a plurality of descriptor tables; and a descriptor load instruction, immediately following the selector load instruction, for loading a descriptor from the descriptor table selectively addressed by the table index, and for storing the descriptor into the segment register; whereby the forwarded table index selectively addresses the descriptor table only when the descriptor load instruction is immediately preceded by the selector load instruction.

In another aspect, it is a feature of the present invention to provide a method for loading a descriptor from one of a plurality of descriptor tables, within a processing environment, the method includes: loading a selector having a table index from a register; forwarding the table index from the loaded selector to descriptor table selection logic; selecting one of the plurality of descriptor tables based on the value of the table index; and loading the descriptor indexed by the selector from the selected one of the plurality of descriptor tables; whereby the step of selecting and the step of loading the descriptor only occur if preceded by the step of forwarding the table index.

An advantage of the present invention is that there is no delay between reading the selector, and determining which descriptor table is needed from which to load the descriptor.

Another advantage of the present invention is that a descriptor load can be accomplished in two clock cycles (or two micro instructions).

BRIEF DESCRIPTION OF THE DRAWINGS

These and other objects, features, and advantages of the present invention will become better understood with regard to the following description, and accompanying drawings where:

FIG. 4 is a diagram illustrating a selector.

FIG. 5 is a diagram illustrating a descriptor.

FIG. 8 is a pipeline instruction flow table illustrating a descriptor load operation without utilizing the present invention.

FIG. 9 is a pipeline instruction flow table illustrating a descriptor load operation utilizing the present invention.

DETAILED DESCRIPTION

As mentioned above, before data in a memory segment can be accessed by a program, the segment must be made addressable by loading the selector/descriptor for the segment into a segment register. A detailed description of how a segment register is loaded, including how the segment descriptor is loaded into the associated shadow descriptor register will be provided below with reference to FIG. 7. However, prior to describing a segment register load, a general background of a pipeline processor which performs the load is provided in FIG. 1. After that, FIGS. 2–6 provide a general background of segment registers within an x86 processor.

Figure 1:
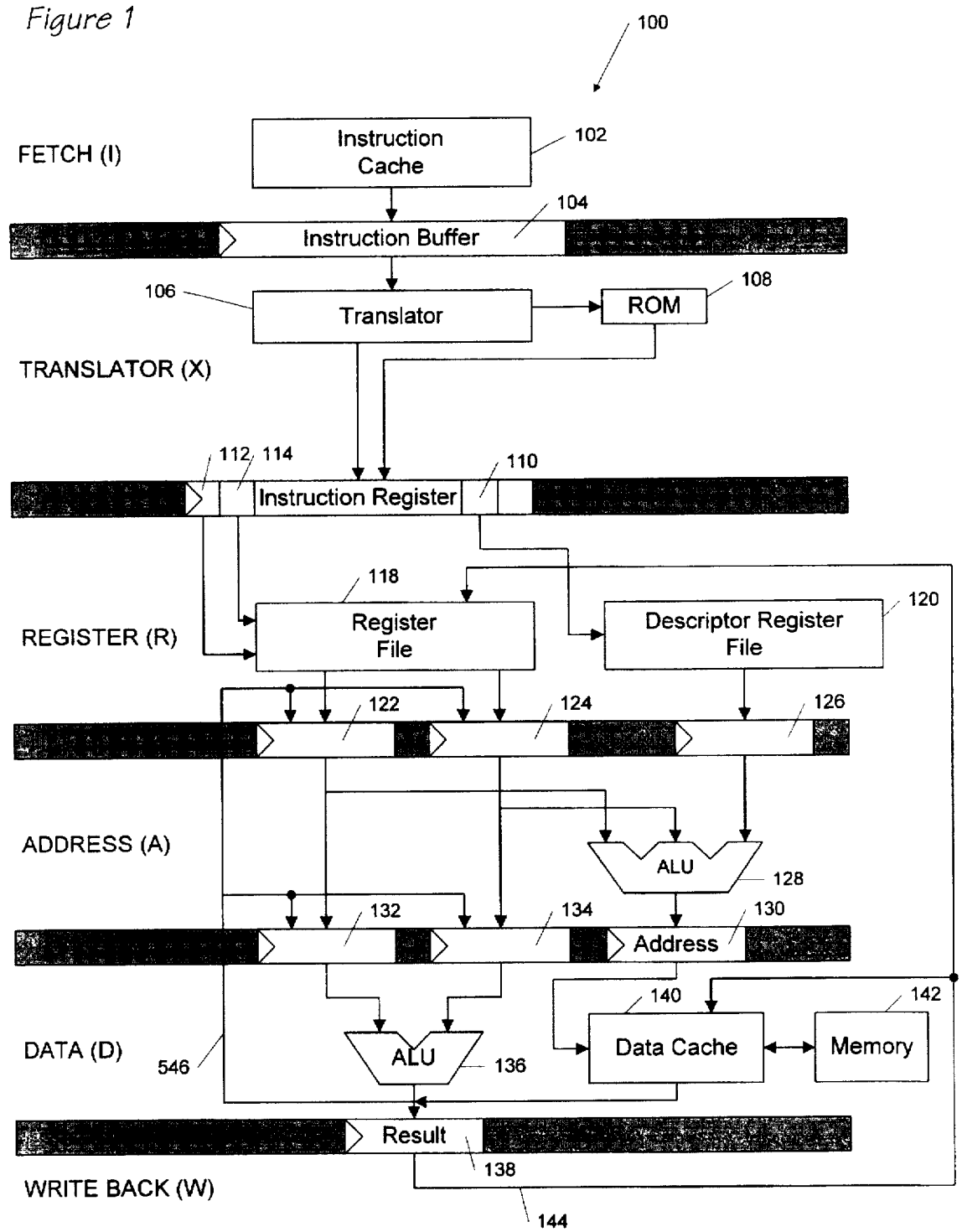
FIG. 1 is a schematic diagram of a pipeline processor which can include the apparatus and method of the present invention.

Referring to FIG. 1, a pipeline processor 100 is shown. The processor 100 has a six stage pipeline, with the stages including: Fetch; Translator; Register; Address; Data; and Write Back. During the fetch stage, the processor 100 sends out a value in the program counter (not shown) to fetch the next macro instruction from an instruction cache 102 and places the macro instruction into an instruction buffer 104. The instruction buffer 104 holds the macro instruction that will be needed in subsequent clock cycles. Other buffers, registers, etc. may be placed between the fetch stage and the translate/decode stage, or between other stages in the processor 100, as required. However, for ease of illustration, only specific buffers and registers have been called out.

The translate/decode stage reads the macro instruction located in the instruction buffer 104 into the translator 106. The translator 106 decodes the macro instruction into a sequence of micro instructions, and provides the micro instructions, one at a time, to an instruction register 110. Depending on the complexity of the macro instruction, and the goals of the designer, the micro instruction sequence may be provided either directly by the translator 106, by a control ROM 108, or by a combination of both.

As shown, the instruction register 110 contains a couple of sections 112, 114 which may be used to store information relating to operands upon which the micro instructions will operate. These sections are provided to a register file 118 and to a descriptor register file 120 during the register stage of the pipeline. The contents of sections 112, 114 access specific registers in the register file 118 and select the contents of those registers to be output into two temporary registers 122, 124 for use in later clock cycles. Temporary register 126 may then be used in later cycles to calculate an address for a memory segment.

When a micro instruction requires access to a memory location, either for Load or Store operations, the address stage calculates the linear address. The address is calculated by providing the contents of registers 122, 124, and 126 as inputs to an ALU circuit 128. The ALU circuit 128 selects appropriate inputs, and stores the linear address in an address register 130. For micro instructions which do not require calculation of a linear address, the contents of registers 122, 124 are forwarded directly to temporary registers 132, 134 for use in later stages.

During the data stage, one of two operations occur. The first operation provides the contents of the registers 132, 134 as inputs to an ALU 136 for operation thereon. The result of the operation is placed in a result register 138. A second operation occurs when the micro instruction is not an ALU operation, but rather a Load or Store operation from memory. In this instance, the address in register 130 is provided as input to a data cache 140 to load data therefrom. If the operation is a Load, the data in the data cache 140 is placed in the result register 138. If the data does not reside in the data cache 140, the cache 140 accesses a memory 142, retrieves the requested data, and places the data in the result register 138.

During the write back stage, the contents of the result register 138 are written into either the data cache 140 (if a store operation), or the register file 118 (if a LOAD or ALU operation), via signal line 144. Prior to the write back stage, however, the output of the ALU 136 or the data cache 140 are provided on a forward/bypass bus as possible inputs to temporary registers 122, 124, 132, or 134, for use in later processor cycles. Use of the forward/bypass bus allows use of the value in the result register 138 as an input to either the ALU circuit 128, or the ALU 136 on the next processor cycle.

In addition to the buffers and registers called out in FIG. 1, other information relating to micro instructions may be passed from stage to stage along buses 148, 150, 152 and 154. Thus, FIG. 1 shows how an instruction flows through the data path of pipeline processor 100. At the end of each clock cycle, every value computed during that clock cycle and required on a later clock cycle is written into a storage device, which may be a memory 142, a register file 118, or a temporary register.

Figure 2:
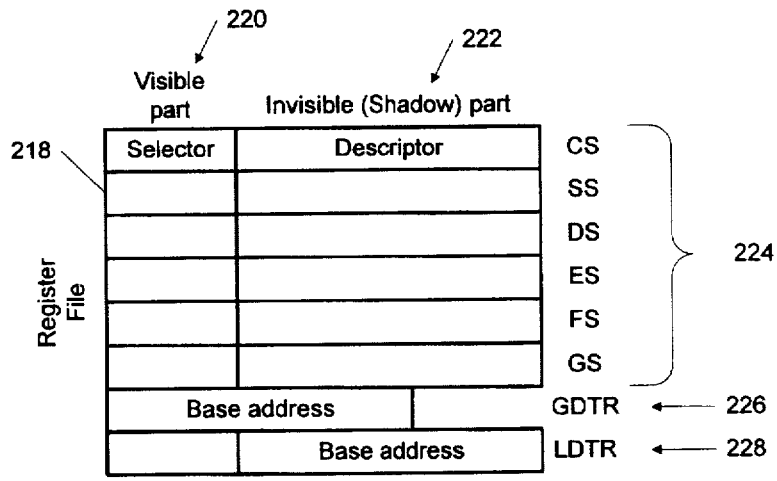
FIG. 2 is a block diagram illustrating segment registers within a register file.

Now referring to FIG. 2, a register file 218 is shown. The register file 218 is similar to the register file 118 shown in FIG. 1. The register file 218 includes six segment registers 224 which each have a visible part 220 and an invisible (or shadow) part 222. The visible part 220 stores a selector, and the invisible part 222 stores a descriptor associated with the selector. Selection of a particular segment in memory is made by reference to one of the segment registers 224. In x86 processors, the segment registers 224 include: CS, SS, DS, ES, FS and GS.

Also within the register file 218 are a global descriptor table register (GDTR) 226 and a local descriptor table register (LDTR) 228. The GDTR 226 stores the base address for the global descriptor table (GDT), and the LDTR 228 stores a selector and descriptor for the local descriptor table (LDT). When one of the segment registers 224 is loaded with selector/descriptor information, either the GDTR 226 or the LDTR 228 provides the base address for the desired descriptor table, as will be further discussed below, with reference to FIG. 7. The register file 218 also contains a number of general purpose registers (not shown) for use in temporarily storing operands for a microprocessor.

Figure 3:
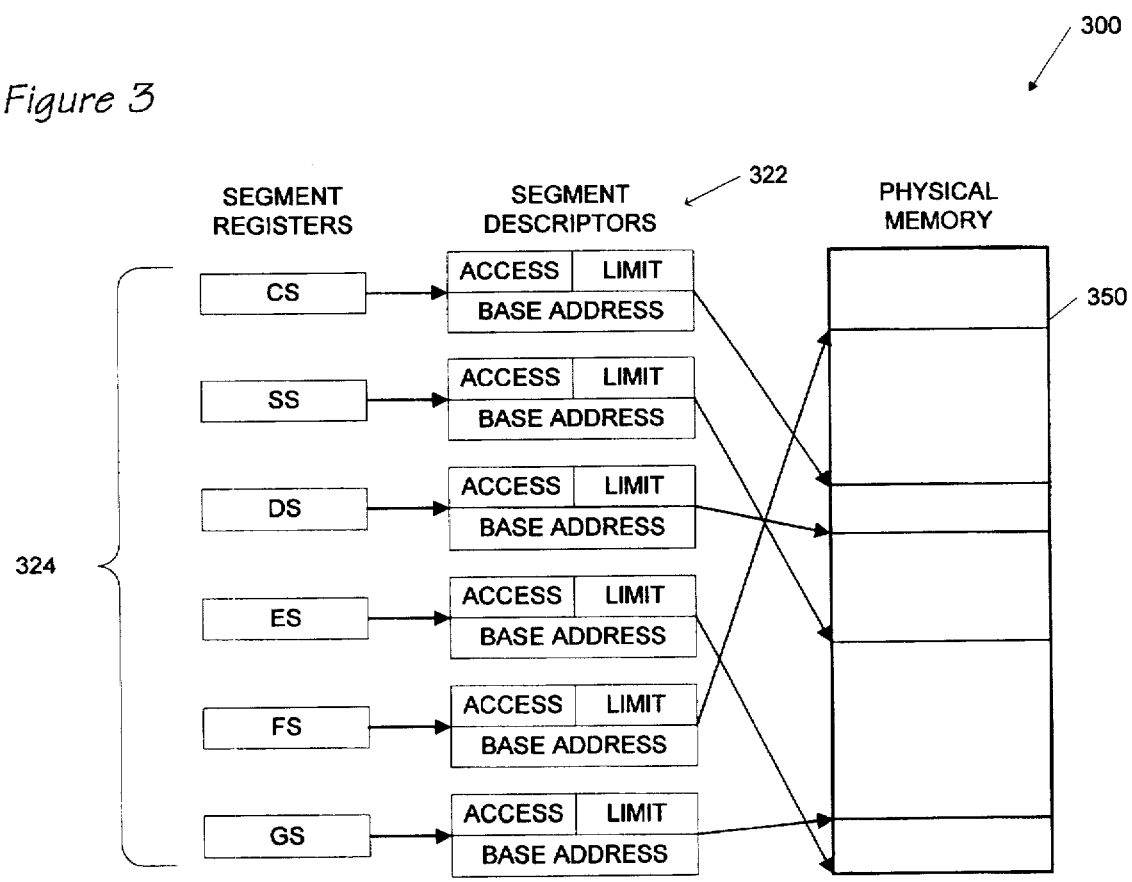
FIG. 3 is a block diagram which illustrates a multi-segment memory model.

Now referring to FIG. 3, a multi-segment memory model 300 is shown which illustrates the relationship between segment registers 324 and physical memory 350. The segment registers 324 are shown associated with segment descriptors 322 which specify the base address, limit, and access rights for a memory segment. Up to six segments can be ready for immediate use by previously storing their selectors/descriptors into the segment registers 324. Other segments are accessed by first loading their segment selectors into the segment registers, as discussed below.

Now referring to FIG. 4, a block diagram is shown which indicates the format of a selector 400 which is stored within one of the segment registers shown in FIGS. 2 & 3. The selector 400 is 16-bits wide, and contains a 13-bit descriptor index 402, a 1-bit table indicator 404, and a 2-bit requester privilege level 406. As shown, when the table indicator 404 is equal to zero, the global descriptor table (GDT) is specified by the selector. When the table indicator 404 is equal to one, the local descriptor table (LDT) is specified by the selector.

Now referring to FIG. 5, a block diagram is shown which indicates the format of a descriptor 500 which is stored within one of the invisible parts of the segment registers shown in FIGS. 2 & 3. The descriptor 500 is 64-bits wide, and contains a 32 bit base address (bits L:16–31, H:0–7, H:24–31), a 16-bit segment limit (bits L:0–15), and various attribute bits (H:8–23).

Figure 6:
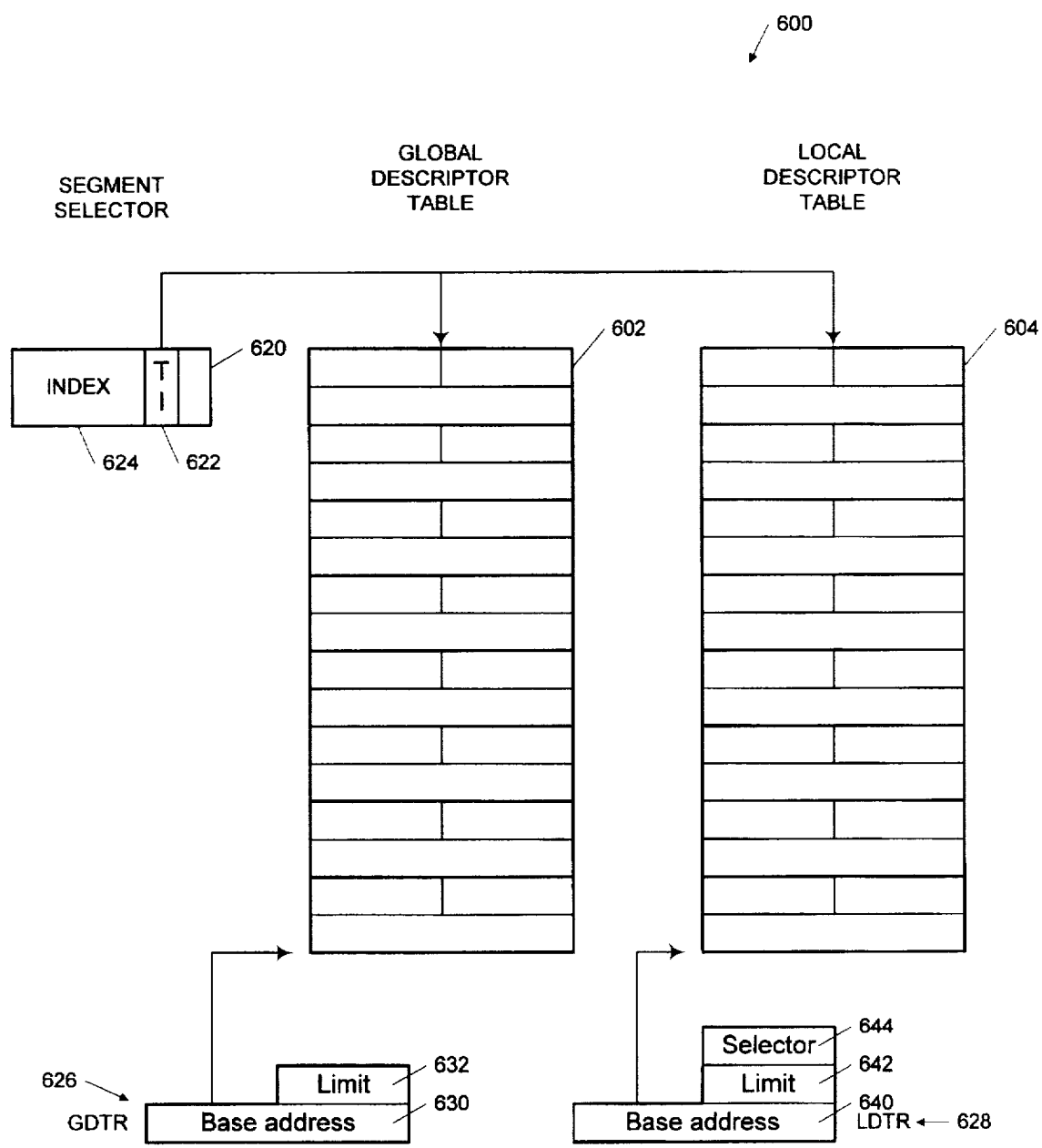
FIG. 6 is a block diagram illustrating global and local descriptor tables.

Now referring to FIG. 6, a block diagram 600 is shown which illustrates how a TI bit 622 in a selector 620 selects a descriptor from either a global descriptor table 602 or a local descriptor table 604. Both the GDT 602 and LDT 604 have a plurality of descriptors. The GDT 602 is accessed when the selector 620 contains a TI bit 622 with a value of zero. This indicates that the descriptor for the desired segment is stored within the GDT 602. The base address 630 and the limit 632 of the GDT are stored within the global descriptor table register 626. The particular descriptor to be loaded is determined by adding the descriptor index 624 in the selector 620 to the base address 630 of the GDTR 626.

If the TI bit 622 in the selector 620 has a value of one, then the LDT 604 is accessed. The LDTR 628 contains the base address 640, the limit 642, and the selector 644 associated with the local descriptor table 604. The descriptor to be loaded is determined by adding the selector index 624 to the base address 640 in the LDTR 628.

Figure 7:
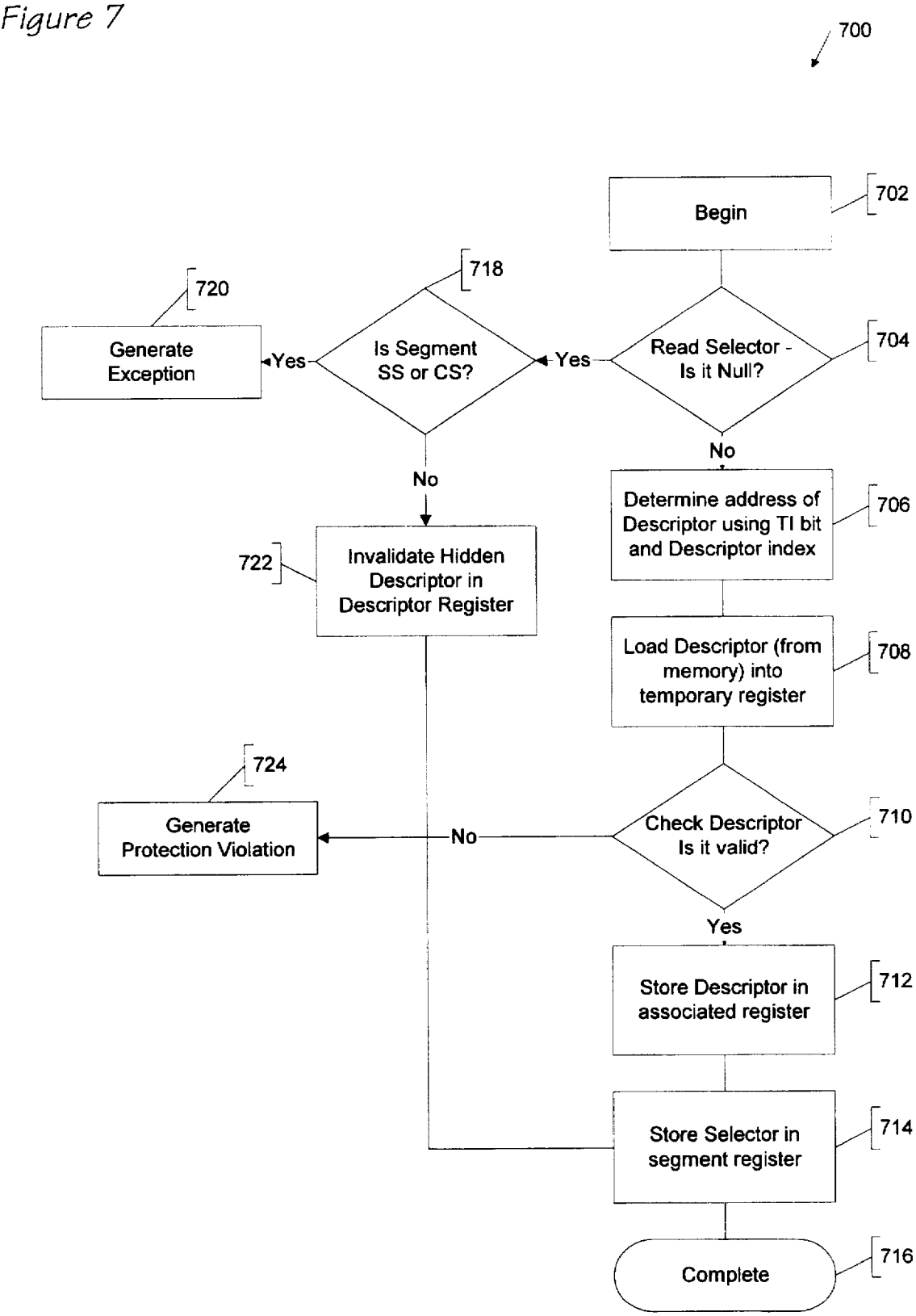
FIG. 7 is a flowchart illustrating a method of loading a descriptor.

With the above as a general background on memory segments, segment registers, selectors and descriptors, a detailed description of how a segment register is loaded will be provided with reference to FIG. 7. As mentioned above, once a segment register has been loaded, future reference to the same segment does not require another load. Rather, the descriptor associated with a particular segment can be provided immediately by the register file to the address stage of a processor. However, before data in a memory segment can be accessed by a program, the segment must be made addressable by loading the selector for the segment into one of the segment registers (for example, by a MOV DS,AX instruction).

When a selector is loaded, it is first checked for validity. If these checks fail, an exception is raised and the segment register is not modified. If the selector is valid and not null, the corresponding descriptor is retrieved from the memory resident segment descriptor table, and another set of checks is applied. Note: a null selector is a special selector which has TI=0 and index=0, and is used when a placeholder selector is needed, but when no segment makes sense. It occupies the first descriptor slot in the GDT. If these checks fail, an exception is raised and the segment register is not modified. If the descriptor checks pass, the descriptor is stored into the corresponding shadow registers. Then, when the segment register is specified in an address, the descriptor is available on-chip in special registers for efficient processing.

Now referring to FIG. 7, a flowchart 700 is shown which illustrates the method of loading a segment register. Program flow begins at step 702. At step 704, a selector is read, either from memory, or from a general purpose register within a register file. The selector is placed within a temporary register, both for testing, and to prevent the destination segment register from being overwritten prior to complete validation of the new memory segment. The selector is tested to determine whether it is null. A null selector is valid for loading into the DS,ES,FS, and GS registers, but not SS or CS. If the selector is null, instruction flow proceeds to step 718.

At step 718, the processor determines whether the selector is being loaded into either the stack segment register (SS) or the code segment register (CS). If it is, the processor proceeds to block 720 and generates an exception.

If the null selector is to be loaded into one of the other segment registers, the processor, at block 722, invalidates the hidden descriptor in the descriptor register. Then any subsequent memory reference that uses the segment register will raise an exception. The processor then proceeds to block 714 and writes the selector into the segment register.

If at block 704 the processor determines, that the selector is not NULL, the processor proceeds to block 706. At block 706 the processor determines the address of the descriptor. This involves extracting the TI bit to determine which descriptor table applies, GDT or LDT, and utilizing the descriptor index to determine the location within the descriptor table of the desired descriptor. The processor then proceeds to block 708.

At block 708, the processor has calculated the address of the descriptor using the descriptor index in the selector, and the base address of the descriptor table, stored in either the GDTR or the LDTR. The processor then loads the descriptor into a temporary (invisible) register within the processor. The processor then proceeds to block 710.

At block 710, the processor checks the descriptor to determine whether it is valid. Basic descriptor load validity checking assures that the selected descriptor is a segment which may lawfully be accessed via the segment register type and is accessible from the current privilege level. Failure of these tests will result in an immediate protection violation exception, illustrated by block 724. If the descriptor passes the checks, the processor proceeds from block 710 to block 712.

At block 712, the processor stores the descriptor into the hidden descriptor register associated with the selector segment. The processor then proceeds to block 714.

By the time the processor reaches block 714, the descriptor has been determined, checked, and stored into the hidden register associated with the selector segment. The processor now stores the selector in the segment register. The segment selector/descriptor is now ready to be referenced by another instruction in a program. The process is complete as shown by block 716.

What should be clear from the above is that a number of micro instruction steps are required to load a segment register. One of these steps, step 706, requires that a selector be stored in a temporary register, and that the TI bit of the selector be extracted to determine whether the desired descriptor is stored in the GDT or the LDT. To further illustrate this requirement, reference is now made to FIG. 8 where a pipeline instruction flow table 800 is provided which shows a MOV instruction which causes the DS segment register to be loaded.

During clock cycle 1, a macro instruction MOV DS,AX is fetched from an instruction cache and provided to the processor. The MOV DS,AX instruction causes a value stored in the AX register to be used as a selector, and causes the selector, along with its associated descriptor, to be stored in the CS register.

At clock cycle 2, the MOV DS,AX is provided to the translator for decoding.

At clock cycle 3, the translator begins generation of the micro instruction sequence necessary to perform the segment register load. The micro instruction sequence contains four instructions: 1) LOAD temp,AX; 2) BT temp,#5; 3) JC LDTR; and 4) JMP GDTR. The first of these instructions is provided to the register stage by the end of clock cycle 3.

The first instruction, LOAD temp,AX causes the contents of the AX register to be placed into a temporary register, for use by later instructions. The second instruction, BT temp,#5 performs a bit test on the 3rd bit of the temporary register.

The third bit of the temporary register is the location of the TI bit for a selector. This bit test sets or clears the CF flag in an x86 processor depending on the value of the $3^{rd}$ bit in the temporary register. If the $3^{rd}$ bit is a 1, indicating that the desired descriptor is in the LDT, then the third instruction, JC LDTR causes the processor to branch to an LDTR subroutine which loads the DS register with a descriptor from the LDT. If the $3^{rd}$ bit in the temporary register is a 0, indicating that the desired descriptor is in the GDT, then the $3^{rd}$ instruction does not jump, and the $4^{th}$ instruction JMP GDTR is executed. The fourth instruction jumps to a subroutine which loads the DS register with a descriptor from the GDT.

As the micro instruction sequence proceeds through the pipeline, concluding in the write back stage, what should be clear as that a descriptor load requires a minimum of 3 clock cycles to get to the point of loading a descriptor. This is because the TI bit of the selector must either be extracted, compared, or tested to first determine which of the two tables, GDT or LDT, contains the desired descriptor.

Now referring to FIG. 9, a micro instruction sequence according to the present invention is shown within a pipeline flow table 900. During clock cycle 1, a MOV DS,AX macro instruction is fetched from the instruction cache and provided to and instruction buffer for execution.

During clock cycle 2, the MOV DS,AX instruction is provided to a translator for decoding.

During clock cycle 3, the translator begins generating the micro instruction sequence for performing the DS register segment load. In this instance, only two instructions are required to perform the load. The first instruction, XTI DS,AX causes the contents of the AX register to be loaded into a temporary register, which will be written into the DS register during the write back stage. In addition, the XTI instruction causes the $3^{rd}$ bit of the temporary register to be provided as an address input to the register file for the following instruction (as will be described with reference to FIG. 10. The second instruction, XLDESC DS, causes the descriptor to be loaded, and stored within the DS register.

The XTI DS,AX, and XLDESC DS instructions proceed down the pipeline, causing the DS segment register to be loaded with the selector from the AX register, and the associated descriptor, in just two clock cycles. By insuring that the XLDESC instruction is always proceeded by the XTI instruction, GDTR/LDTR addressing for the XLDESC instruction may presume that the proper descriptor table will be referenced by the preceding instruction. This is more fully illustrated by reference to FIG. 10.

Figure 10:
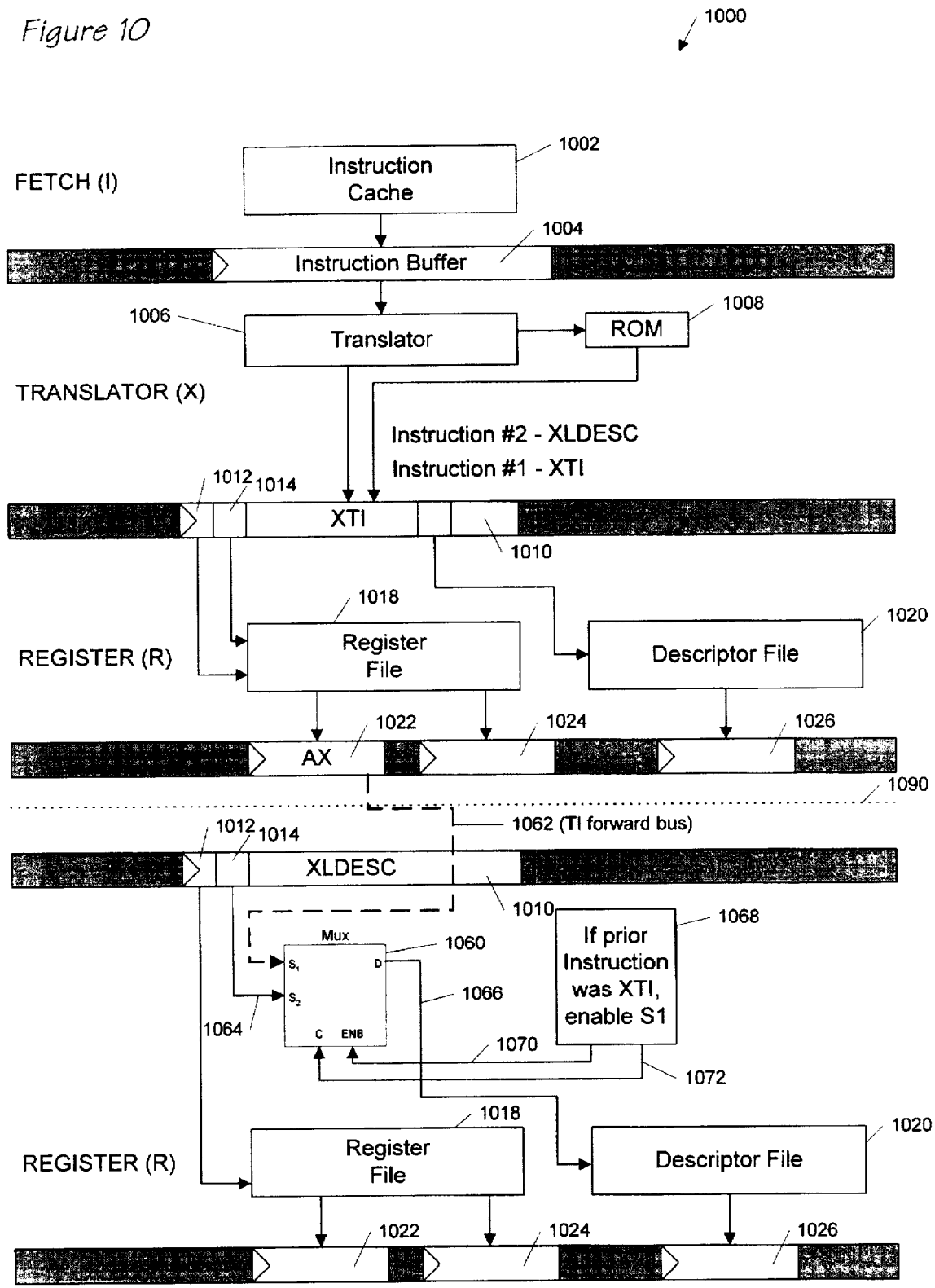
FIG. 10 is a schematic diagram of a pipeline processor which includes the apparatus and method of the present invention.

In FIG. 10, a portion of a pipeline processor 1000 is shown. The processor 1000 is similar to that shown in FIG. 1, but the address, data and write back stages have been removed so that attention can be focused on the register stage.

The processor 1000 includes an instruction cache 1002 connected to an instruction buffer 1004. The instruction buffer 1004 provides instructions to a translator 1006 which decodes the instructions, and provides the instructions either directly, or via a control ROM 1008, to an instruction register 1010. The instruction register 1010 includes two operand locations 1012, 1014 for storing operands to be addressed in a register file 1018. The register file 1018 outputs registers addressed by the operands 1012, 1014 into temporary buffers 1022, 1024 for use in later stages in the pipeline. The register file is also connected to a descriptor file 1020 which stores descriptors of corresponding segment registers.

Below the temporary buffers 1022, 1024 and 1026 is a dotted line 1090 to indicate that the rest of the pipeline processor 1000, which was shown in FIG. 1, has been removed from FIG. 10 to better illustrate the present invention. Below the dotted line 1090, the register stage is shown again, but this time including a TI bit selection mux 1060 connected between the temporary buffer 1022 and the register file 1018 via a TI forward bus 1062, and a descriptor address bus 1066. The mux 1060 is also shown connected to an operand 1014 within the instruction register 1010. Finally, the mux 1060 is connected to clear/enable logic 1068 via enable line 1070 and clear line 1072. The second instance of the register stage has been shown to illustrate the operation of the register stage during execution of the two micro instructions XTI and XLDESC which were discussed above with reference to FIG. 9.

Above the dotted line 1090, the instruction register 1010 is shown to include the micro instruction XTI. During a first clock cycle, the XTI instruction, located in the instruction register 1010, causes a selector to be read from a general purpose register in the register file 1018, in this example the AX register, and places the contents of the AX register into the temporary buffer 1022 for use in later stages in the pipeline. In addition, the XTI micro instruction causes the TI bit of the selector in the temporary buffer 1022 to be forwarded to the mux 1060 via the TI forward bus 1062 for use in the next instruction. The TI bit will be used in the following clock cycle to select between the GDTR and LDTR registers in the register file 1018. The contents of the selected GDTR or LDTR register will be used by following clock cycles to retrieve the desired descriptor from either the GDT or LDT, as discussed above.

During the next clock cycle, the XLDESC micro instruction is in the instruction register 1010, which causes the contents of either the GDTR or the LDTR to be retrieved from the register file 1018, and in the case of the LDTR, the associated descriptor in the descriptor file 1020, so that the appropriate descriptor table, GDT or LDT may be referenced by later stages in the pipeline. The clear/enable logic 1068 is used to provide operand information, via bus 1064 to the register file 1018 for micro instructions not involving a descriptor load. However, when an XLDESC micro instruction is in the register stage, and that instruction has been proceeded by an XTI micro instruction, the clear/enable logic 1068 selects the forwarded TI bit as an input to the register file 1018.

The circuit shown in FIG. 10 presumes that the XLDESC instruction will always be preceded by the XTI instruction. This eliminates any delays that might be associated with first determining whether the extracted TI bit should be muxed into the XLDESC instruction. By insuring that the XTI/XLDESC sequence always occurs together, the TI bit may be forwarded to the mux 1060, and as an address operand to the register file 1018, without any processing delays. And, by extracting the TI bit as an address operand during the XTI instruction, no bit tests are required on the selector prior to performing a descriptor load.

Although the present invention has been described in considerable detail with reference to certain preferred versions thereof, other versions are possible. For example, the circuit shown in FIG. 10 has been placed within the register stage of a pipeline processor. One skilled in the art should appreciate that the use of the pipeline processor 1000 was for illustrative purposes only. Other processor implementations could also utilize the features of the present invention. In addition, in some processors, the register stage may be combined with one of the other stages, while still performing the similar function of storing and retrieving selectors in a register file. Furthermore, the micro instruction sequence which is used to first load a selector, and then a descriptor, presumes a single instruction pipe. It is possible that the instructions may flow in parallel, in a dual pipeline processor, with appropriate logic to insure that the TI bit in the selector is used to select the appropriate descriptor register for the second instruction.

Although the present invention and its objects, features, and advantages have been described in detail, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A descriptor loading circuit, within a processing system, for selecting a descriptor to be loaded from a plurality of descriptor tables, the descriptor loading circuit comprising:
   an instruction register, for storing micro instructions to be executed by the processing system;
   a register file, coupled to said instruction register, said register file comprising:
      a plurality of segment registers, each for storing a selector and a descriptor;
      a first descriptor table register, for storing an address associated with a first descriptor table; and
      a second descriptor table register, for storing an address associated with a second descriptor table;
   a table index (TI) forward bus, coupled to said register file, for forwarding a table indicator from a selector retrieved by a first one of said micro instructions, said table indicator indicating whether said descriptor to be loaded is to be retrieved from said first descriptor table or said second descriptor table; and
   descriptor table selection logic, coupled to said TI forward bus, and to said register file, for selecting whether said first descriptor table register or said second descriptor table register is to be used to load said descriptor from said first or said second descriptor table, as indicated by said table indicator forwarded by said TI forward bus;
   wherein said descriptor is loaded from said first or said second descriptor table, without latency, regardless of whether said table indicator indicates said first descriptor table or said second descriptor table.

2. The descriptor loading circuit, as recited in claim 1, wherein said descriptor defines the base address and limit of a memory segment.

3. The descriptor loading circuit, as recited in claim 1, wherein said micro instructions comprise:
   load selector instructions; and
   load descriptor instructions.

4. The descriptor loading circuit, as recited in claim 1, wherein one of said plurality of segment registers is used to store said descriptor which is loaded.

5. The descriptor loading circuit, as recited in claim 1, wherein each of the selectors within said plurality of segment registers comprises:
   a TI bit, for indicating which of the plurality of descriptor tables is to be used to load said descriptor; and
   an index for indexing into the plurality of descriptor tables to locate said descriptor to be loaded.

6. The descriptor loading circuit, as recited in claim 1, wherein said first descriptor table register comprises a Global Descriptor Table Register (GDTR).

7. The descriptor loading circuit, as recited in claim 1, wherein said second descriptor table register comprises a Local Descriptor Table Register (LDTR).

8. The descriptor loading circuit, as recited in claim 1, wherein said first descriptor table comprises a Global Descriptor Table (GDT), the GDT comprising an array of segment descriptors.

9. The descriptor loading circuit, as recited in claim 1, wherein said second descriptor table comprises a Local Descriptor Table (LDT), the LDT comprising an array of segment descriptors.

10. The descriptor loading circuit, as recited in claim 1, wherein said first micro instruction causes said selector to be retrieved from said register file and causes said table indicator to be forwarded on said TI forward bus.

11. The descriptor loading circuit, as recited in claim 1, wherein when said indicator is 0, the descriptor to be loaded is retrieved from said first descriptor table.

12. The descriptor loading circuit, as recited in claim 1, wherein when said table indicator is 1, the descriptor to be loaded is retrieved from said second descriptor table.

13. The descriptor loading circuit, as recited in claim 1, wherein said descriptor table selection logic comprises a multiplexer, connected between an output of said register file, and an input of said register file.

14. The descriptor loading circuit, as recited in claim 1, wherein said first one of said micro instructions causes said selector to be retrieved from said register file.

15. The descriptor loading circuit, as recited in claim 14, wherein said table indicator comprises a TI bit within said selector.

16. A table index (TI) bit forwarding circuit, within a microprocessor, for improving the execution time of a sequence of micro instructions which load a descriptor, the TI bit forwarding circuit comprising:
   a register file, for storing a selector which includes a TI bit, said selector corresponding to the descriptor which is to be loaded, said register file further comprising:
      a segment register, into which the descriptor is to be loaded;
      a first descriptor table register, for storing an address associated with a first descriptor table; and
      a second descriptor table register, for storing an address associated with a second descriptor table;
      wherein said TI bit within said selector indicates whether said first descriptor table register or said second descriptor table register is to be used to load the descriptor into said segment register;
   a TI bit forward bus, coupled to said register file, for forwarding said TI bit within said selector which is retrieved from said register file during a first micro instruction; and
   a TI bit selection circuit, coupled to said TI bit forward bus, and to said register file, for utilizing said forwarded TI bit to select between said first descriptor table register and said second descriptor table register during a second micro instruction;
   whereby when said forwarded TI bit is used to select between said first and second descriptor table registers, said second micro instruction immediately follows said first micro instruction.

17. The TI bit forwarding circuit, as recited in claim 16, wherein the descriptor defines a base address and limit for a memory segment.

18. The TI bit forwarding circuit, as recited in claim 16, wherein said selector further comprises an index, for indexing said descriptor within one of said descriptor tables.

19. The TI bit forwarding circuit, as recited in claim 16, wherein said segment register comprises:

a selector register, for storing said selector; and a descriptor register, for storing said descriptor.

20. The TI forwarding circuit, as recited in claim 16, wherein said second micro instruction causes the descriptor to be loaded into said segment register.

21. The TI bit forwarding circuit, as recited in claim 16, wherein said second descriptor table comprises an array of local descriptors.

22. The TI bit forwarding circuit, as recited in claim 21, wherein said second descriptor table register stores a base address for said array of local descriptors.

23. The TI bit forwarding circuit, as recited in claim 16, wherein said first descriptor table comprises an array of global descriptors.

24. The TI bit forwarding circuit, as recited in claim 23, wherein said first descriptor table register stores a base address for said array of global descriptors.

25. The TI bit forwarding circuit, as recited in claim 24, wherein when said TI bit within said selector is 0, said base address of said array of global descriptors is used to load the descriptor into said segment register.

26. The TI bit forwarding circuit, as recited in claim 16, wherein said first micro instruction contains a command to cause said TI bit within said selector to be provided to said TI bit selection circuit via said TI bit forward bus during a first clock cycle.

27. The TI bit forwarding circuit, as recited in claim 26, wherein said TI bit selection circuit utilizes said forwarded TI bit to select between said first descriptor table register and said second descriptor table register during a second clock cycle.

28. The TI bit forwarding circuit, as recited in claim 27, wherein no micro instructions are required between said first micro instruction and said second micro instruction, to determine whether said first descriptor table register or said second descriptor table register is to be used during said second micro instruction.

29. In a processing system, a method for loading a descriptor into a segment register, the method comprising:

providing a selector load instruction, for reading a selector from a general purpose register, and for forwarding a table index from said selector to selectively address a descriptor table from one of a plurality of descriptor tables; and providing a descriptor load instruction, immediately following said selector load instruction, for loading a descriptor from said one of said plurality of descriptor tables selectively addressed by said table index, and for storing said descriptor into said segment register;

whereby said forwarded table index selectively addresses said one of said plurality of descriptor tables only when said descriptor load instruction is immediately preceded by said selector load instruction.

30. The method as recited in claim 29, wherein said selector is read from said general purpose register and is placed into a temporary latch.

31. The method as recited in claim 30, wherein said table index is forwarded from said temporary latch to descriptor table selection logic.

32. The method as recited in claim 31, wherein said descriptor table selection logic is connected to a register file having a plurality of descriptor table registers.

33. The method as recited in claim 32, wherein said plurality of descriptor table registers each address at least one of said plurality of descriptor tables.

34. The method as recited in claim 33, wherein said forwarded table index is used to select one of said descriptor table registers to address one of said plurality of descriptor tables.

35. The method as recited in claim 34, wherein said selector further comprises an index, for indexing said descriptor from said one of said plurality of descriptor tables.

36. A method for loading a descriptor from one of a plurality of descriptor tables, within a processing system, the method comprising the steps of:

loading a selector having a table index from a register;

forwarding the table index from the loaded selector to descriptor table selection logic;

selecting one of the plurality of descriptor tables based on the value of the table index; and loading the descriptor indexed by the selector from the selected one of the plurality of descriptor tables;

whereby said step of selecting and said step of loading the descriptor only occur if preceded by said step of forwarding the table index.

* * * * *